United States Patent
Ashear

(10) Patent No.: US 8,612,584 B2
(45) Date of Patent: *Dec. 17, 2013

(54) USING EBOOK READING DATA TO GENERATE TIME-BASED INFORMATION

(75) Inventor: Joseph Ashear, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/220,582

(22) Filed: Aug. 29, 2011

(65) Prior Publication Data

US 2013/0054786 A1    Feb. 28, 2013

(51) Int. Cl.
  *G06F 13/00* (2006.01)
(52) U.S. Cl.
  USPC .......................................... 709/224; 709/203
(58) Field of Classification Search
  USPC .................................................. 709/224, 203
  See application file for complete search history.

(56) References Cited

U.S. PATENT DOCUMENTS

| | | | |
|---|---|---|---|
| 8,260,915 B1 * | 9/2012 | Ashear | 709/224 |
| 2003/0093336 A1 * | 5/2003 | Ukita et al. | 705/26 |
| 2003/0193423 A1 * | 10/2003 | Ng et al. | 341/68 |
| 2003/0210226 A1 | 11/2003 | Ho et al. | |
| 2004/0025111 A1 | 2/2004 | Park | |
| 2009/0306959 A1 | 12/2009 | Rappoport et al. | |
| 2010/0086130 A1 * | 4/2010 | Wang et al. | 380/46 |
| 2011/0050594 A1 * | 3/2011 | Kim et al. | 345/173 |
| 2011/0066965 A1 * | 3/2011 | Choi | 715/776 |
| 2011/0153047 A1 | 6/2011 | Cameron et al. | |
| 2011/0195388 A1 * | 8/2011 | Henshall et al. | 434/317 |

OTHER PUBLICATIONS

PCT International Search Report and Written Opinion for PCT/US2012/051546, Feb. 18, 2013, 8 Pages.
Provisional Patent Application filed for U.S. Appl. No. 61/350,965, filed Jun. 3, 2010, 61 Pages.

* cited by examiner

*Primary Examiner* — Ario Etienna
*Assistant Examiner* — Uzma Alam
(74) *Attorney, Agent, or Firm* — Fenwick & West LLP

(57) ABSTRACT

Reading data from an eBook is used to generate time-based information. Timing reports are received from a plurality of clients. The timing reports describe reading time intervals for reading portions of an eBook on the clients. Timing reports from different clients describe reading time intervals for different overlapping portions of the eBook. The overlapping portions are analyzed to generate timing information. The timing information describes reading speeds for granular portions of the book that are smaller than the portions described in the reading time intervals. The timing information is stored. Timing information is provided to a client enabling the client to provide advanced features. The features include estimating a user's current reading position and providing an estimate of the time required by the user to finished reading a portion of the eBook.

27 Claims, 7 Drawing Sheets

USING EBOOK READING DATA TO GENERATE TIME-BASED INFORMATION

FIELD OF DISCLOSURE

The invention generally relates to electronic books (eBooks) and particularly relates to collecting and providing timing information about the reading of such books.

BACKGROUND INFORMATION

Many people are transitioning from reading physical books to reading eBooks, which have many advantages over physical books, such as more portability, the ability to access the eBook from multiple electronic devices, and text search capability. In addition, eBooks are also easier to purchase and are perceived as environmentally-friendly.

However, eBooks also suffer some drawbacks in comparison to physical books. For example, eBooks lack physical cues to tell a reader his or her current relative location in the book. In a physical book, a reader can readily ascertain the reader's current reading location relative to the entire book or another point by viewing the number of physical pages already read or remaining to be read. Readers use this information, for example, to determine whether to start reading a new chapter in an allotted reading period or whether to purchase a new book before departing on a trip. This information can be useful, but is still far from ideal since the reader may inaccurately estimate how long it will take to finish reading a chapter or other portion of text.

Reading devices for eBooks address this issue by providing readers with information intended to substitute for the lack of physical pages. For example, an eBook reader may present the reader with a page count (e.g., "Page 42 of 265") or a user interface that visually represents the reader's current location in the eBook. This information is helpful but can still be improved. For instance, the page count can be misleading because different reading devices display differently-sized pages. As a result, readers lack information they would have with physical books.

SUMMARY OF THE INVENTION

The above and other issues are addressed by a computer-implemented method, computer system, and non-transitory computer-readable storage medium for using eBook reading data to generate time-based information. An embodiment of the method includes receiving timing reports from a plurality of clients. The timing reports describe reading time intervals for portions of an eBook read on the clients. Timing reports from different clients describe reading time intervals for different overlapping portions of the eBook. The method also includes analyzing the overlapping portions described in the reading time intervals of the timing reports for the eBook to generate timing information describing reading speeds for granular portions of the eBook smaller than the portions described in the reading time intervals. The generated timing information is stored.

An embodiment of the computer system for using eBook reading data to generate time-based information includes a non-transitory computer-readable storage medium having executable computer program instructions. The instructions include instructions for receiving timing reports from a plurality of clients. The timing reports describe reading time intervals for portions of an eBook read on the clients. Timing reports from different clients describe reading time intervals for different overlapping portions of the eBook. The instructions further include analyzing the overlapping portions described in the reading time intervals of the timing reports for the eBook to generate timing information describing reading speeds for granular portions of the eBook smaller than the portions described in the reading time intervals. The generated timing information is stored. The computer system also includes a processor for executing the computer program instructions.

An embodiment of the medium stores executable computer program instructions for using eBook reading data to generate time-based information. The instructions perform steps including receiving timing reports from a plurality of clients. The timing reports describe reading time intervals for portions of an eBook read on the clients. Timing reports from different clients describe reading time intervals for different overlapping portions of the eBook. The steps further include analyzing the overlapping portions described in the reading time intervals of the timing reports for the eBook to generate timing information describing reading speeds for granular portions of the eBook smaller than the portions described in the reading time intervals. The generated timing information is stored.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
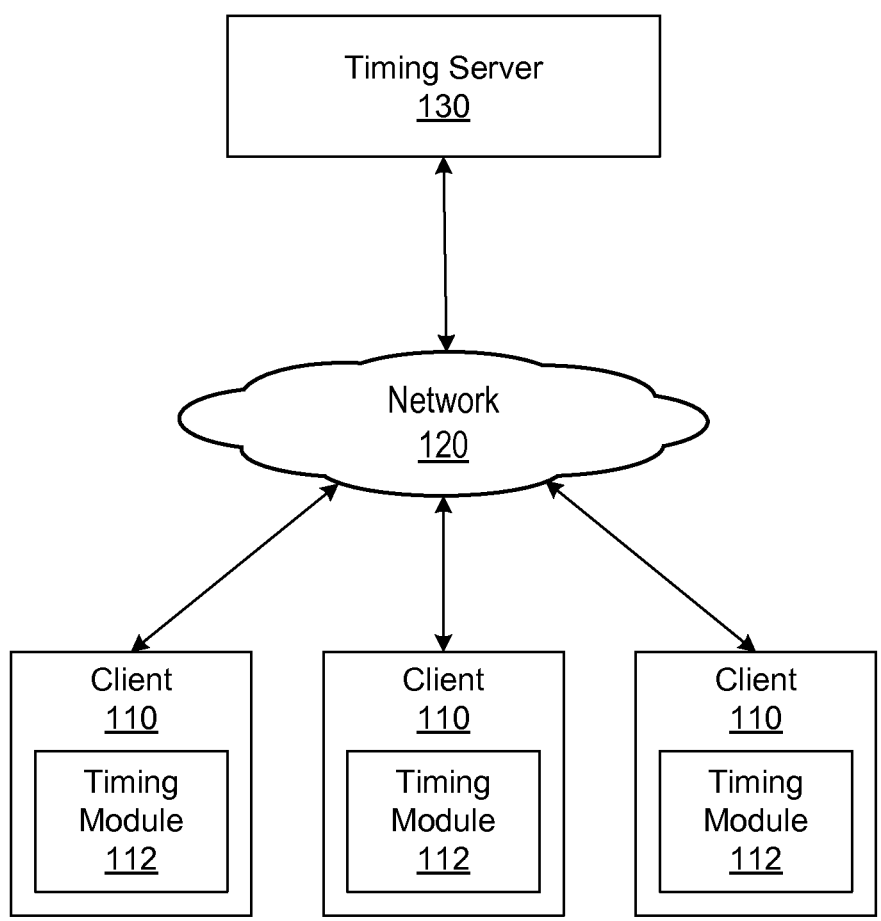
FIG. 1 is a high-level block diagram illustrating an environment for using eBook reading data to generate time-based information in accordance with one embodiment.

FIG. 1 is a high-level block diagram illustrating an environment 100 for using eBook reading data to generate time-based information in accordance with one embodiment. As shown, the environment 100 includes multiple clients 110 connected to a timing server 130 via a network 120. While only one timing server 130 and three clients 110 are shown in FIG. 1 for clarity, embodiments can have multiple servers and many clients. Moreover, the timing server 130 may be implemented as cloud-based service distributed across multiple physical servers.

The clients 110 are electronic devices used by one or more users to read eBooks. A client 110 can be, for example, a mobile phone, desktop, laptop, or tablet computer, or a dedicated eBook reader ("eReader"). The client 110 may execute one or more applications that support activities including reading eBooks and browsing and obtaining content available from servers on the network 120. An eBook is a form of electronic content that is primarily textual in nature. The content of an eBook may be, for example, a novel, a textbook, or a reference book. As used herein, the term "eBook" also includes other electronic content that is primarily textual, such as magazines, journals, newspapers, or other publications.

The clients 110 include display screens that show portions of eBooks to the users. The portion of text shown on a display screen at one time is referred to as a "page" of the eBook. The amount of text shown on a page by a given client 110 depends upon multiple variables including the size of client's display screen and characteristics of the text such as typeface, font size, margin spacing and line spacing. For example, the amount of text shown on a page by laptop computer with a large display is typically significantly more than the amount of text shown on a page by a mobile phone with a small display. Thus, the display of a laptop might show 300 words at a time while the display of a mobile phone might show only 50 words at a time. The number of words shown on a page can also change if the user makes the text larger or smaller.

The user of a client 110 changes the pages of an eBook by issuing page-turn commands. The type of command issued by the user can vary based on the client 110. For example, some clients 110 have physical page turn buttons that the user presses to advance to the next or previous page. Other clients 110 have touch-sensitive display screens and the user issues a page-turn command by gesturing on the screen.

In one embodiment, the clients 110 include timing modules 112 that record the time intervals (i.e., elapsed time) between page-turn commands issued by the users. Depending upon the embodiment, the timing modules 112 can be integrated into firmware executed by the clients 110, integrated into operating systems executed by the clients, or contained within applications executed by the clients.

During normal use of the client 110 for reading an eBook, the user will issue page-turn commands as the user reads each page and advances to the next page. For clients 110 that replace the entire page of text in response to a page-turn command, the time interval between sequential forward page-turn commands issued by a user is a proxy for the amount of time it took the user to read the text on the page. Hence, the time interval is referred to as a "reading time interval." The reading time interval will vary for different users having different reading speeds, and will also vary depending upon the amount of text shown on each page and the complexity of the text. The timing modules 112 send timing reports to the timing server 130 describing the recorded reading time intervals for pages of eBooks.

The timing server 130 is a computer or other electronic device that uses the timing reports to generate timing information describing the eBooks or users. The timing server 130 may be operated by an entity that provides eBooks and other electronic content to the clients 110 or may be operated by a different entity.

In general, the timing information generated by the timing server 130 describes the time required to read a portion of an eBook. For example, the timing server 130 may use the timing reports received from the various clients 110 to determine the average time required by a group of users to read a given portion of an eBook. Further, the timing server 130 can exploit the fact that different clients paginate eBooks differently, and that different timing reports describe different overlapping portions of the same eBook, to generate timing information for eBook portions more granular than the pages described in the timing reports. Thus, the timing information can indicate the time required by an average user to read a sentence or even a word in an eBook.

In one embodiment, the timing server 130 provides the timing information to the timing modules 112 of the clients 110. The timing modules 112, in turn, use the timing information to provide timing data to the users that enhance the users' reading experiences. For example, a timing module 112 can use the timing information to estimate a user's current reading position within a page and provide features, such as bookmarking, that use the position information. In addition, the timing module 112 can use the timing information to provide an estimate of the time required by the user to finish reading the eBook or a portion of the eBook.

The network 120 represents the communication pathway between the timing server 130 and clients 110. In one embodiment, the network 120 uses standard communications technologies or protocols and can include the Internet. Thus, the network 120 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies or formats including image data in binary form (e.g. Portable Network Graphics (PNG), the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In another embodiment, the entities on the network 120 can use custom or dedicated data communications technologies instead of, or in addition to, the ones described above.

Figure 2:
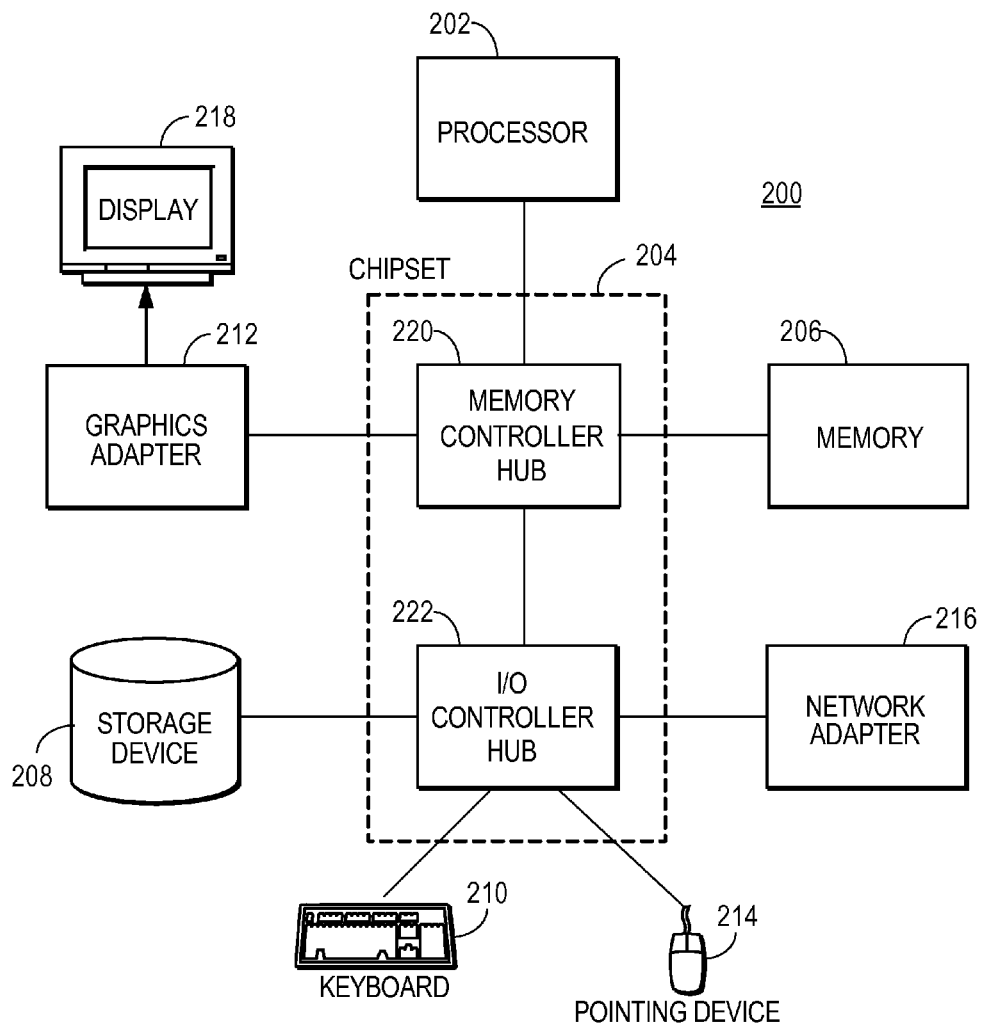
FIG. 2 is a high-level block diagram illustrating an example of a computer for use as a timing server or a client, in accordance with one embodiment.

FIG. 2 is a high-level block diagram illustrating an example of a computer 200 for use as a timing server 130 or a client 110, in accordance with one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 120. Some embodiments of the computer 200 have different or other components than those shown in FIG. 2. For example, the timing server 130 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, or software. In one embodiment, program modules formed of executable computer program instructions are stored on the storage device 208, loaded into the memory 206, and executed by the processor 202.

Figure 3:
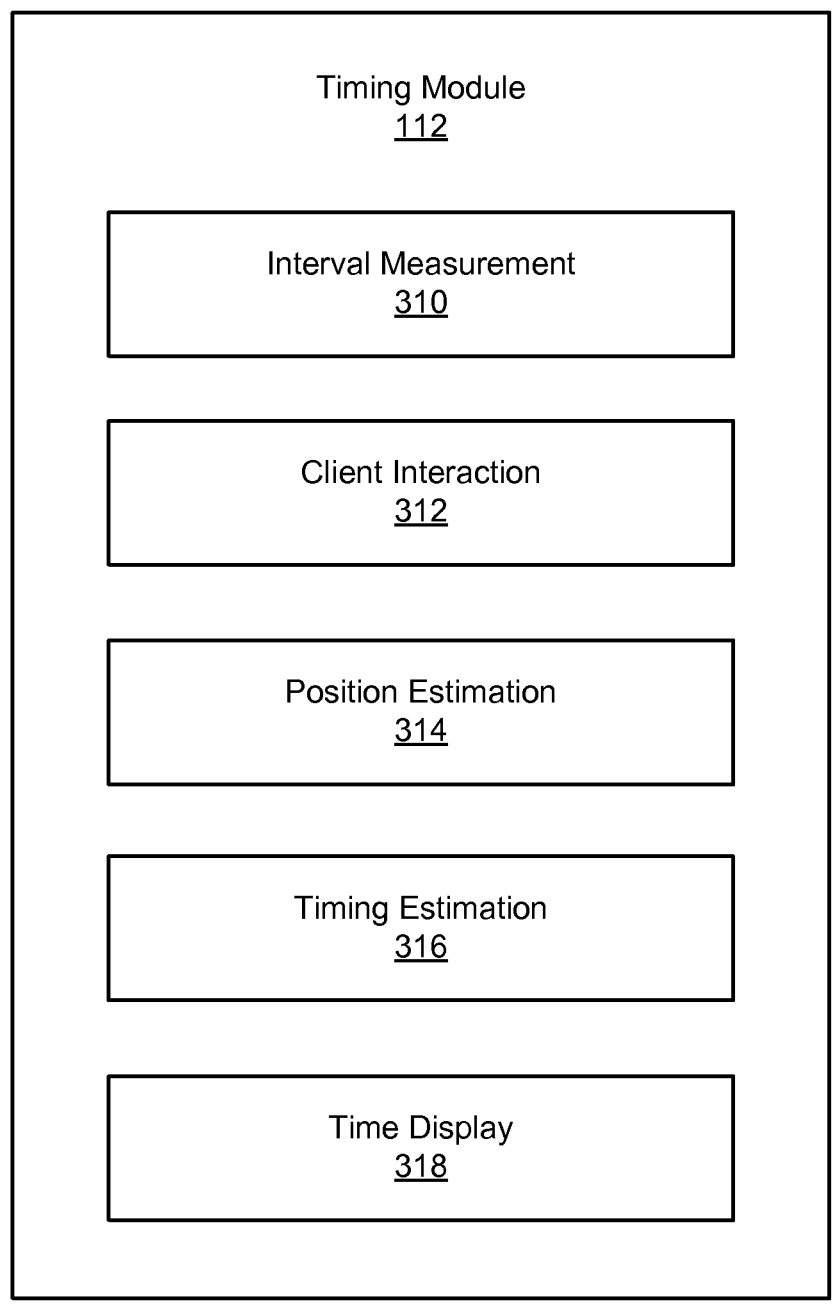
FIG. 3 is a high-level block diagram illustrating a detailed view of the timing module of a client according to one embodiment

FIG. 3 is a high-level block diagram illustrating a detailed view of the timing module 112 of a client 110 according to one embodiment. As shown in FIG. 3, multiple modules are included within the timing module 112. In some embodiments, the functions are distributed among the modules in a different manner than described herein. Moreover, the functions are performed by other entities in some embodiments, such as by the timing server 130.

An interval measurement module 310 measures reading time intervals between page-turn commands. In one embodiment, the interval measurement module 310 activates a timer upon detecting a page-turn command and uses the timer to measure the time elapsed until a new page-turn command is detected. The interval measurement module 310 stores the measured time intervals in association with the pages of the eBooks to which they pertain.

Different embodiments of the interval measurement module 310 may measure time intervals in various different ways. For example, the interval measurement module 310 may measure only forward page-turn commands because backward page-turn commands are less likely to be reflective of a user's reading speed. The interval measurement module 310 may also omit measurement of page turn comments that are close in time to events that signify the start or end of a reading session, such as time intervals bordered by the turning on or off of the client 110. In addition, the interval measurement module 310 may measure intervals between multiple page-turn commands and may activate the timer in response to different events, such as the display of a new page instead of the detection of a page turn command.

A client interaction module 312 sends timing reports to the timing server 130. The timing reports indicate the reading time intervals for the pages of eBooks measured by the interval measurement module 310. A timing report may include, for example, an identifier of the client 110 sending the report, an identifier of the eBook being read on the client, an identifier of the user of the client, a description of the text displayed on the page associated with the report (i.e., the beginning and endpoints of the text on the page described by the associated reading time interval), and the time interval itself. A timing report may describe time intervals for one or more pages. The information in the timing report may be anonymous to avoid disclosing private information about the user or client 110.

The client interaction module 312 may send the timing reports contemporaneously with when the timing intervals are measured or send multiple reports in batch. For example, the client interaction module 312 may store timing reports if network 120 connectivity is absent or limited and then send the timing reports once connectivity becomes available, or send timing reports at the completion of a chapter or other location within the text. Likewise, the client interaction module 312 may send timing reports upon initiating or deactivating of the reading functionality of the client 110.

In addition, the client interaction module 312 requests and receives timing information from the timing server 130. The timing information may indicate, for example, average reading speeds for a group of users of pages, sentences, words or other portions of text within eBooks. The timing information may also indicate the user's reading speed or describe other timing-related aspects of the eBook. "Reading speed" generally refers to the amount of text a user can read in a specified amount of time. For purposes of convenience, reading speed is often described herein as words per minute (WPM). However, reading speed can be represented in other ways, such as an amount of time required to read a word or other portion of text.

A position estimation module 314 estimates the user's current reading location on a displayed page of an eBook. In one embodiment, the position estimation module 314 estimates the user's reading location based on the user's reading speed. For example, the position estimation module 314 may determine the user's reading location by measuring the time elapsed since the page was turned and comparing the elapsed time with the user's reading speed to determine how far into the displayed page the user has read. The estimated position may be used, e.g., to place a bookmark at the estimated position based on a command from the user or based on the occurrence of another event such as the user turning the client 110 off. For example, the position estimation module 314 may place the bookmark at a paragraph located at the user's estimated reading position.

A timing estimation module 316 estimates the time required for a user to read an unread portion of an eBook. In one embodiment, the timing estimation module 316 makes this estimate based on the user's determined reading speed. For example, the timing estimation module 316 may make the estimate based on the user's determined reading speed and the amount of text within the unread portion for which the estimate applies.

In another embodiment, the timing estimation module 316 also uses information received from the timing server 130 to make the estimate. For example, the timing estimation module 316 may make the estimate by using the timing information to determine the average reading speed for a group of users that have read the portion, and scaling the average speed by a speed modifier that describes the user's reading speed relative to the average reading speed of the group. Thus, if the average time to read a portion of text is 30 minutes, and the speed modifier for the user is 150% (indicating that the user reads at 150% of the speed of the average reader), the timing estimation module 316 might estimate that it would take the reader 20 minutes to read the portion. This latter embodiment is more precise than using only the user's reading speed because it accounts for variances in average reading speed within the text. If a portion of the eBook is particularly difficult, this difficulty will be reflected in the timing information received from timing server 130 which, in turn, will result in a more precise estimate for the user.

In one embodiment, the timing estimation module 316 estimates the time it will require the user to read the remaining unread text in the eBook. For example, the module 316 may estimate the time required for the user to finish reading the eBook, a chapter of the eBook, a specified number of pages, etc. The timing estimation module 316 may display this estimate to the user. The user can use the time estimate to decide whether to finish reading a chapter, whether to purchase a new eBook, or to make other decisions that are based in part on the timing information.

A time display module 318 uses information received from the timing server 130 to display timing data to the user indicating the reading speeds of different portions of eBooks. For example, the time display module 318 may use color-coding or another technique to graphically illustrate the differences in average reading speed for different portions of an eBook. The user can use this information to identify portions that take longest to read which may in turn indicate the portions that are particularly thought-provoking. The time display module 318 may combine the time display with other information, such as information indicating which portions are frequently highlighted by other readers, to provide additional insight for identifying thought-provoking portions.

Figure 4:
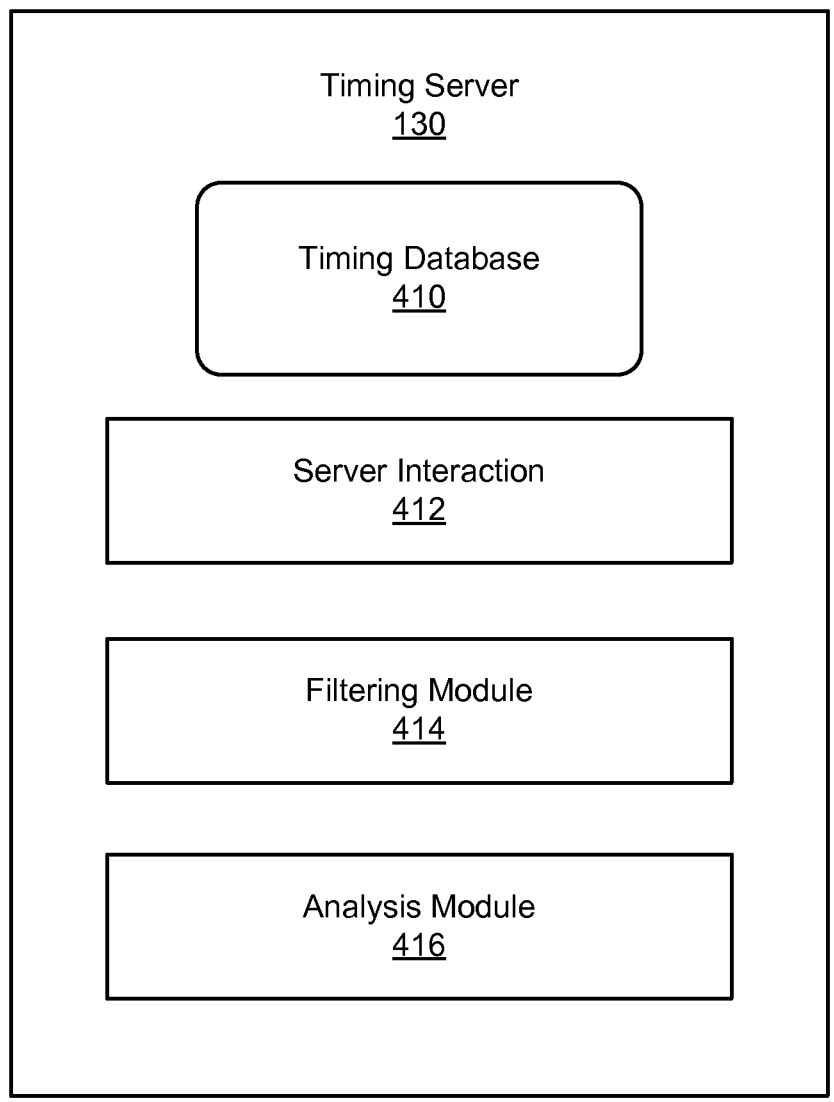
FIG. 4 is a high-level block diagram illustrating a detailed view of the timing server according to one embodiment.

FIG. 4 is a high-level block diagram illustrating a detailed view of the timing server 130 according to one embodiment. As shown in FIG. 4, multiple modules are included within the timing server 130. In some embodiments, the functions are distributed among the modules in a different manner than described herein. Moreover, the functions are performed by other entities in some embodiments, such as by the client 110 or timing module 112.

A timing database 410 stores timing reports received from the clients 110. As previously mentioned, the timing reports include time intervals and may also include other information such as a client identifier, a user identifier, an eBook identifier, and a description of the page of the eBook associated with the time interval. In one embodiment, the timing database 410 stores the timing reports keyed by the user identifier so that all reports associated with specific users can be identified. The timing database 410 may also store the timing reports keyed by eBook or portions of an eBook, by client 110 or by other keys.

In one embodiment, the timing database 410 also stores timing information generated by the timing server 130 from the received timing reports. This timing information may include information associated with specific users, such as average or other reading speeds and speed modifiers describing the users' reading speeds relative to the reading speed of other users. In addition, the timing information may include information associated with specific eBooks. The eBook timing information may include reading times (e.g., average reading times) for portions of an eBook. Thus, the eBook timing information may include the average reading times for entire eBooks, chapters of eBooks, and paragraphs, sentences, or words in the eBooks.

In one embodiment, the timing information in the timing database 410 is updated as new timing reports are received from the users. Alternatively, the timing information may be updated periodically, after a certain amount of time has passed, after a certain number of timing reports have been received, or based on other factors. The timing information may also be weighted based on the number of timing reports received for a particular user/eBook or based on other factors.

A server interaction module 412 receives timing reports from the clients 110 and stores the reports in the timing database 410. In addition, the server interaction module 412 receives requests for timing information from the clients 110 and provides information from the database 410 in response thereto. The requests from a client 110 may be, for example, requests for the reading speed of a user of the client, for the speed modifier of the user, or for timing information associated with an eBook being read on that client.

A filtering module 414 filters timing reports received from the clients 110 to remove reports that are likely erroneous or inaccurate. The filtering module 414 may filter out timing reports that indicate abnormally high or low reading time intervals. These timing reports may result from abnormalities such as the user rapidly flipping forward through the pages of text or being interrupted while reading a page of text. In one embodiment, the filtering module 414 compares reading time intervals in the timing reports with lower and upper thresholds and filters out timing reports not falling within the thresholds. The thresholds can be based on the timing information stored in the timing database or other factors. For example, the thresholds can be based on the average reading time intervals for the text portions described by the reports, on average reading time intervals for the type of client 110 sending the report, average reading time intervals from the user that sent the report, or average reading time intervals across multiple eBooks. Further, the filtering module 414 may filter timing reports based on criteria other than reading time intervals. For example, the filtering module 114 may filter reports from a client 110 that sends an abnormally high volume of reports. The functions of filtering module 414 may also be incorporated within the timing modules 112 of the clients 110 or any other module.

An analysis module 416 analyzes the timing reports in the timing database 410 and generates the timing information. The types of analysis and information generated by the analysis module 416 can vary in different embodiments. The analysis module 416 may generate reading speed information for individual users of the clients. To this end, the analysis module 416 calculates statistics from the user's timing reports describing the user's reading speed. For example, the analysis module 416 may calculate the user's average reading speed by dividing the number of words in a portion of one or more eBooks by the amount of time required by the user to read the portion. The portion of the eBook used to perform the calculation can be a page or subset of pages in an eBook, an entire eBook, or multiple eBooks, depending upon the embodiment.

Similarly, the analysis module 416 may generate combined reading speed information for a group of users of the clients 110. As with individual readers, the combined reading speed information is a statistical measure describing the time required by the group of users to read a portion of one or more eBooks. For clarity, this description often refers to the combined reading speed as being the average reading speed of the group of users. However, the combined reading speed may be represented by other statistical measures, such as the median reading speed of the users in the group.

The analysis module 416 may select the group of users for which the combined reading speed information is generated based on a variety of factors. The analysis module 416 may select a group of users who have read a particular eBook or set of eBooks. The analysis module 416 can use this group of users to generate, e.g., the average reading speed of the group of users for the eBook. The analysis module 416 may also select groups of users based on demographic information of the users, geographic locations of the users, etc.

The analysis module 416 may also generate speed modifiers that describe individual users' reading speeds relative to a combined reading speed of a group of users. In one embodiment, the speed modifier for a user is represented as a scale factor describing how much slower or faster the user's reading speed is relative to the group's average reading speed. For example, if the user's reading speed is twice as fast as the average reading speed of the group of users, the user's speed modifier may be "2". Other embodiments represent the speed modifier using other techniques.

Further, the analysis module 416 may generate reading speed information associated with specific portions of an eBook. In general, reading speeds often vary over portions of an eBook. For example, the reading speed might be slower for a portion of an eBook that includes mathematical equations or particularly dense prose than for other portions of the eBook. Reading speed may also be determined for other formats of information that are part of an eBook including illustrations, formulas, footnotes, and any other common visual element. Hence, the analysis module 416 generates reading speed information that describes the reading speeds of particular portions of eBooks relative to other portions. In one embodiment, reading speed can be determined for formats of information within a portion of text. For example, timing server 130 may calculate the amount of time that an average user spends looking at illustrations or formulas in a portion of an eBook.

This reading speed information may be represented in multiple ways. In one embodiment, the analysis module 416 specifies the reading speed for a particular portion (e.g., a chapter) as the average reading speed of readers of that chapter. For example, the analysis module 416 can specify a reading speed of 50 WPM for a dense chapter, and of 150 WPM for a different, easier-to-read, chapter. In another embodiment, the analysis module 416 specifies the reading speed for a portion of an eBook as a scale factor relative to a base reading speed. For example, the analysis module 416 can specify that the reading speed of the dense chapter is 50% of the average reading speed of a group of users for the entire eBook in which the chapter is contained.

Further, in one embodiment the analysis module 416 uses the fact that different clients 110 paginate eBooks differently to generate reading speed information associated with portions of the eBooks more granular than the pages, such as for sentences or words of an eBook. There may be many clients 110, and the clients may paginate eBooks differently due to variations in display screen size, font size, etc. Many of the pages from different clients 110 partially overlap, which allows the analysis module 416 to determine reading speeds for the overlapping portions. Given enough samples, this technique allows the analysis module 416 to determine reading speeds for overlapping portions as small as a sentence or word. In one embodiment, the analysis module 416 can determine whether there are insufficient samples to calculate a reading speed for a portion of text and store a reading speed placeholder indicating that no estimate is available. This placeholder may also be used if the variance is too high in received timing reports and confidence is low in the accuracy of the corresponding reading speed information. In one embodiment, reading speed information is generated and a confidence level is assigned to the accuracy of the reading speed information. A client 110 can subsequently determine whether to make use of timing information generated having low confidence. The analysis module 416 saves the generated reading speed information in association with the respective portions of the eBooks in the timing database 410. As a result, portions of the eBooks have associated reading speeds that can be used by the clients 110 or timing server 130 to determine, e.g., the time required for a user to read a portion of an eBook or estimate the user's reading position within the eBook.

Figure 5:
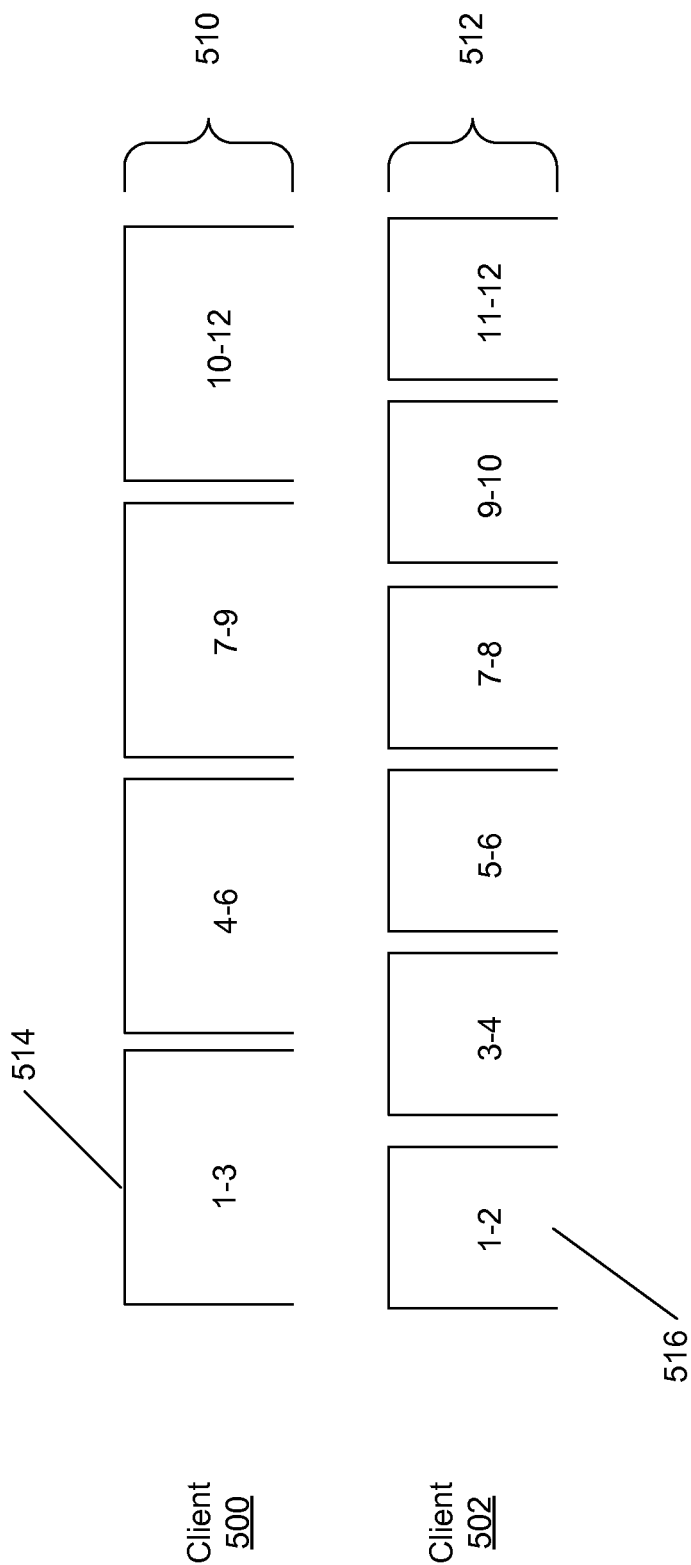
FIG. 5 is a diagram illustrating how clients paginating eBooks differently is used to generate reading speed information for portions of eBooks according to one embodiment.

FIG. 5 is a diagram illustrating how clients 110 paginating eBooks differently is used to generate reading speed information for portions of eBooks according to one embodiment. FIG. 5 illustrates two clients 500, 502. Horizontally adjacent to each client are a set of pages 510, 512 of an eBook displayed by each respective client 500, 502. In this illustration, client 500 displays pages with more text than the pages displayed by the client 502. This difference in page size is illustrated by the portion numbers within the pages. First page 514 displayed by client 500, shows portions 1-3 of the eBook, while first page 516 displayed by client 502, bearing fewer words per page, shows only portions 1-2 of the eBook. Thus, pages 514 and 516 overlap in that they both contain portions 1-2.

The analysis module 416 may, for example, determine the average time to read portion 3 as the difference between the average time required by a group of users to read page 514 showing portions 1-3 and the average time required by a group of users to read page 516 showing portions 1-2. The analysis module 416 saves the determined reading speed in association with portion 3 in the timing database 410. The analysis module 416 may further refine the reading speed information by accounting for the speed modifiers of the individual users when comparing the times required to read the various overlapping pages.

Other methods of generating reading speed information for a portion of an eBook are also possible. For example, for each of the clients 110, the analysis module 416 may calculate a coarse time per word value by simply dividing the reported reading time by the number of words on the displayed page. Using this information for a plurality of clients, a more accurate time for a word may be calculated by averaging the calculated time per word for the plurality of clients. For a given word, this average time per word calculation may be limited to a specific instance of the word in an eBook, all instances of the word in an eBook, or all instances of the word in a plurality of eBooks.

Figure 6:
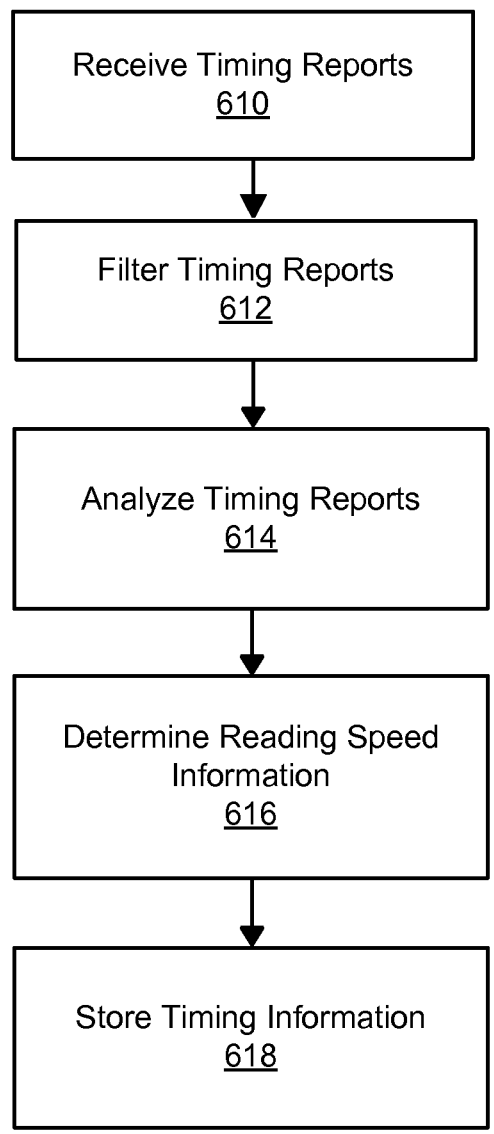
FIG. 6 is a flowchart illustrating a method of using eBook reading data to generate time-based information according to one embodiment.

FIG. 6 is a flowchart illustrating a method of using eBook reading data to generate time-based information according to one embodiment. While this description ascribes the steps of the method to the timing server 130, the clients 110 or other entities can perform some or all of the steps in other embodiments. In addition, the method can perform the steps in different orders or include different steps.

In step 610, the timing server 130 receives timing reports from the clients 110 describing the reading time intervals for portions (e.g., pages) of eBooks. The reports may include identifiers of the client 110, user, and eBook, a description of the text displayed on the page associated with the report, and the time interval. Some of the timing reports from the clients 110 describe reading time intervals for different, but overlapping, portions of the same eBook. In step 612, the timing server 130 filters the reports to remove reports that are likely erroneous or inaccurate, and stores the remaining reports in the timing database 410.

In step 614, the timing server 130 analyzes the timing reports to generate the timing information. This analysis 614 may include generating reading speed information for individual users and for groups of users. For example, the timing server 130 may determine the average reading speed of a group of users for an eBook and determine a speed modifier that describes an individual user's reading speed relative to the group's average speed. In addition, in step 616, the timing server 130 uses the fact that different clients 110 paginate eBooks differently, thereby producing overlapping timing reports, to determine reading speeds associated with portions of eBooks more granular than the portions described by the reading time intervals, such as paragraphs, sentences, and words. In step 618, the timing server 130 stores the timing information in the timing database 610.

Figure 7:
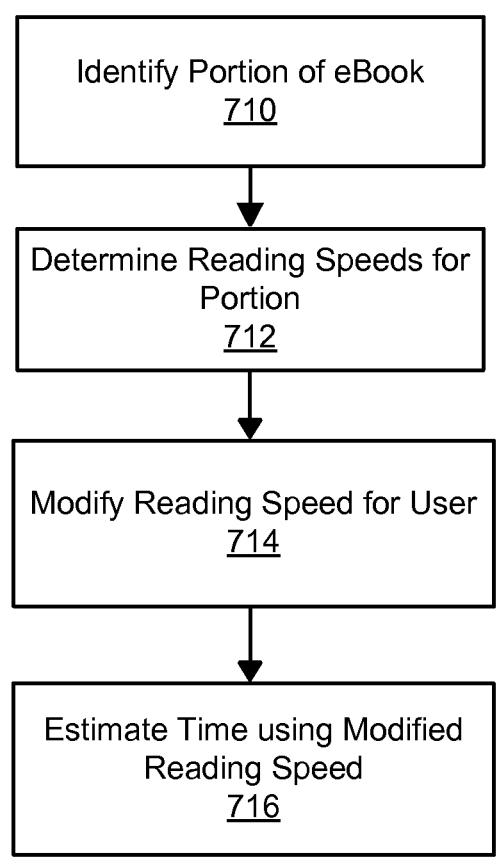
FIG. 7 is a flowchart illustrating a method of estimating the time required for a user to read an unread portion of an eBook according to one embodiment

FIG. 7 is a flowchart illustrating a method of estimating the time required for a user to read an unread portion of an eBook according to one embodiment. While this description ascribes the steps of the method to the timing estimation module 316 of the client, modules of the timing server 130 or other entities can perform some or all of the steps in other embodiments. In addition, the method can perform the steps in different orders or include different steps.

In step 710, the timing estimation module 316 identifies the unread portion of an eBook (i.e., a portion not yet read by the user) for which the time estimate is to be made. For example, the portion may span from the user's current reading position to a subsequent point, such as the end of a chapter or the end of the eBook. In step 712, the timing estimation module 316 determines the reading speeds associated with the unread portion. The module 316 may make this determination, for example, by querying the timing server 130 for timing information associated with the unread portion. The timing information may indicate the average reading speed of a group of users for the unread portion as a whole or for more granular text within the portion, such as for sentences or words. In step 714, the timing estimation module 316 modifies the reading speeds for the unread portion to account for the user's reading speed relative to the average reading speed. In step 716, the timing estimation module 316 uses the modified reading speed to estimate the time required for the user to read the unread portion.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for receiving reading data and analyzing the reading data to determine related timing information. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of using eBook reading data to generate time-based information comprising:
  receiving timing reports from a plurality of clients, the timing reports describing reading time intervals for reading portions of an eBook on the clients, in which the timing reports from different clients describe reading time intervals for different overlapping portions of the eBook;
  analyzing the overlapping portions described in the reading time intervals of the timing reports for the eBook to generate timing information describing times for reading granular portions of the eBook within the overlapping portions; and
  storing the timing information.

2. The method of claim 1, wherein the timing reports describe reading time intervals for pages of the eBook displayed by the clients, and different clients display differently—sized pages.

3. The method of claim 2, wherein the timing reports describe elapsed time between page-turn commands issued by users of the clients.

4. The method of claim 1, further comprising:
  analyzing the timing reports to generate timing information describing reading speeds, for the granular portions of the eBook within the overlapping portions, of a group of users reading the eBook using the plurality of clients.

5. The method of claim 1, further comprising:
  analyzing the timing reports to generate timing information describing reading speeds of a single user reading the eBook using a client.

6. The method of claim 1, wherein a client used by a user to read the eBook is adapted to receive the stored timing information and use the timing information to estimate a time required for the user to read an unread portion of the eBook comprising at least some of the granular portions of the eBook.

7. The method of claim 6, further comprising:
  analyzing the timing reports to determine a speed modifier describing a reading speed of a user reading the eBook using a client relative to a reading speed of a group of users reading the eBook using the plurality of clients;
  wherein the client is adapted to use the speed modifier to estimate the time required for the user to read the unread portion of the eBook.

8. The method of claim 1, wherein a client used by a user to read the eBook is adapted to receive the stored timing information and use the timing information to estimate a current reading position of the user within a portion of the eBook displayed by the client.

9. The method of claim 1, wherein one of the plurality of clients is adapted to send multiple timing reports in a batch describing reading time intervals for multiple portions of the eBook.

10. A computer-implemented system for using eBook reading data to generate time-based information comprising:
   a non-transitory computer-readable storage medium having executable computer program instructions comprising instructions for:
      receiving timing reports from a plurality of clients, the timing reports describing reading time intervals for reading portions of an eBook on the clients, in which the timing reports from different clients describe reading time intervals for different overlapping portions of the eBook;
      analyzing the overlapping portions described in the reading time intervals of the timing reports for the eBook to generate timing information describing times for reading for granular portions of the eBook within the overlapping portions; and
      storing the timing information; and
   a processor for executing the computer program instructions.

11. The system of claim 10, wherein the timing reports describe reading time intervals for pages of the eBook displayed by the clients, and different clients display differently—sized pages.

12. The system of claim 11, wherein the timing reports describe elapsed time between page-turn commands issued by users of the clients.

13. The system of claim 10, further comprising instructions for:
   analyzing the timing reports to generate timing information describing reading speeds, for the portions of the eBook within the overlapping portions, of a group of users reading the eBook using the plurality of clients.

14. The system of claim 10, further comprising instructions for:
   analyzing the timing reports to generate timing information describing reading speeds of a single user reading the eBook using a client.

15. The system of claim 10, wherein a client used by a user to read the eBook is adapted to receive the stored timing information and use the timing information to estimate a time required for the user to read an unread portion of the eBook comprising at least some of the portions of the eBook.

16. The system of claim 15, further comprising instructions for:
   analyzing the timing reports to determine a speed modifier describing a reading speed of a user reading the eBook using a client relative to a reading speed of a group of users reading the eBook using the plurality of clients;
   wherein the client is adapted to use the speed modifier to estimate the time required for the user to read the unread portion of the eBook.

17. The system of claim 10, wherein a client used by a user to read the eBook is adapted to receive the stored timing information and use the timing information to estimate a current reading position of the user within a portion of the eBook displayed by the client.

18. The system of claim 10, wherein one of the plurality of clients is adapted to send multiple timing reports in a batch describing reading time intervals for multiple portions of the eBook.

19. A non-transitory computer-readable storage medium storing executable computer program instructions for using eBook reading data to generate time-based information, the instructions performing steps comprising:
   receiving timing reports from a plurality of clients, the timing reports describing reading time intervals for reading portions of an eBook on the clients, in which the timing reports from different clients describe reading time intervals for different overlapping portions of the eBook;
   analyzing the overlapping portions described in the reading time intervals of the timing reports for the eBook to generate timing information describing times for reading granular portions of the eBook within the overlapping portions; and
   storing the timing information.

20. The computer-readable storage medium of claim 19, wherein the timing reports describe reading time intervals for pages of the eBook displayed by the clients, and different clients display differently—sized pages.

21. The computer-readable storage medium of claim 20, wherein the timing reports describe elapsed time between page-turn commands issued by users of the clients.

22. The computer-readable storage medium of claim 19, wherein the instructions further perform steps comprising:
   analyzing the timing reports to generate timing information describing reading speeds, for the portions of the eBook within the overlapping portions, of a group of users reading the eBook using the plurality of clients.

23. The computer-readable storage medium of claim 19, wherein the instructions further perform steps comprising:
   analyzing the timing reports to generate timing information describing reading speeds of a single user reading the eBook using a client.

24. The computer-readable storage medium of claim 19, wherein a client used by a user to read the eBook is adapted to receive the stored timing information and use the timing information to estimate a time required for the user to read an unread portion of the eBook comprising at least some of the portions of the eBook.

25. The computer-readable storage medium of claim 24, wherein the instructions further perform steps comprising:
   analyzing the timing reports to determine a speed modifier describing a reading speed of a user reading the eBook using a client relative to a reading speed of a group of users reading the eBook using the plurality of clients;
   wherein the client is adapted to use the speed modifier to estimate the time required for the user to read the unread portion of the eBook.

26. The computer-readable storage medium of claim 19, wherein a client used by a user to read the eBook is adapted to receive the stored timing information and use the timing information to estimate a current reading position of the user within a portion of the eBook displayed by the client.

27. The computer-readable storage medium of claim 19, wherein one of the plurality of clients is adapted to send multiple timing reports in a batch describing reading time intervals for multiple portions of the eBook.

* * * * *